United States Patent [19]
Dick et al.

[11] 3,930,258
[45] Dec. 30, 1975

[54] INK MONITORING AND AUTOMATIC FLUID REPLENISHING APPARATUS FOR INK JET PRINTER

[75] Inventors: George H. Dick, Highland Park; Thomas J. Madden, Jr., Elk Grove Village, both of Ill.

[73] Assignee: A. B. Dick Company, Chicago, Ill.

[22] Filed: Jan. 13, 1975

[21] Appl. No.: 540,394

[52] U.S. Cl. ............... 346/75; 117/602; 137/408; 177/118; 346/140
[51] Int. Cl.² ......................................... G01D 18/00
[58] Field of Search ...... 346/75, 140; 117/116, 118, 117/60, 602; 222/56, 58; 137/88, 87, 403, 408

[56] References Cited
UNITED STATES PATENTS

| | | | |
|---|---|---|---|
| 3,051,192 | 8/1962 | Fagot et al. | 222/56 X |
| 3,361,150 | 1/1968 | Horner | 137/93 |
| 3,761,953 | 9/1973 | Helgeson et al. | 346/75 |

*Primary Examiner*—Joseph W. Hartary
*Attorney, Agent, or Firm*—Ronald J. LaPorte; Peter S. Lucyshyn

[57] ABSTRACT

An ink monitoring and automatic ink-solvent fluid replenishing apparatus for use in the twin tank ink supply system of an ink jet printing apparatus includes a mechanical scale upon which the ink supply and return tanks of the system are mounted. The scale assumes a predetermined position upon providing a predetermined volume of ink in said tanks. When the ink volume decreases sufficiently to cause the scale to rise to a first predetermined level, a first switch is actuated thereby to open a valve, permitting ink-solvent replenishing fluid to be drawn from a separate container into the ink return tank. The added volume causes an increase in the weight of the liquid in the tanks, lowering the scale and closing the valve. When replenishing fluid is depleted from the fluid replenishing container the weight of the liquid in the tanks decreases below that weight required to actuate the first switch, raising the scale to a second level. A second switch actuated at this time operates an alarm to inform an operator of the situation. A third switch is operated when the total weight of the liquid in the tanks becomes too great.

9 Claims, 1 Drawing Figure

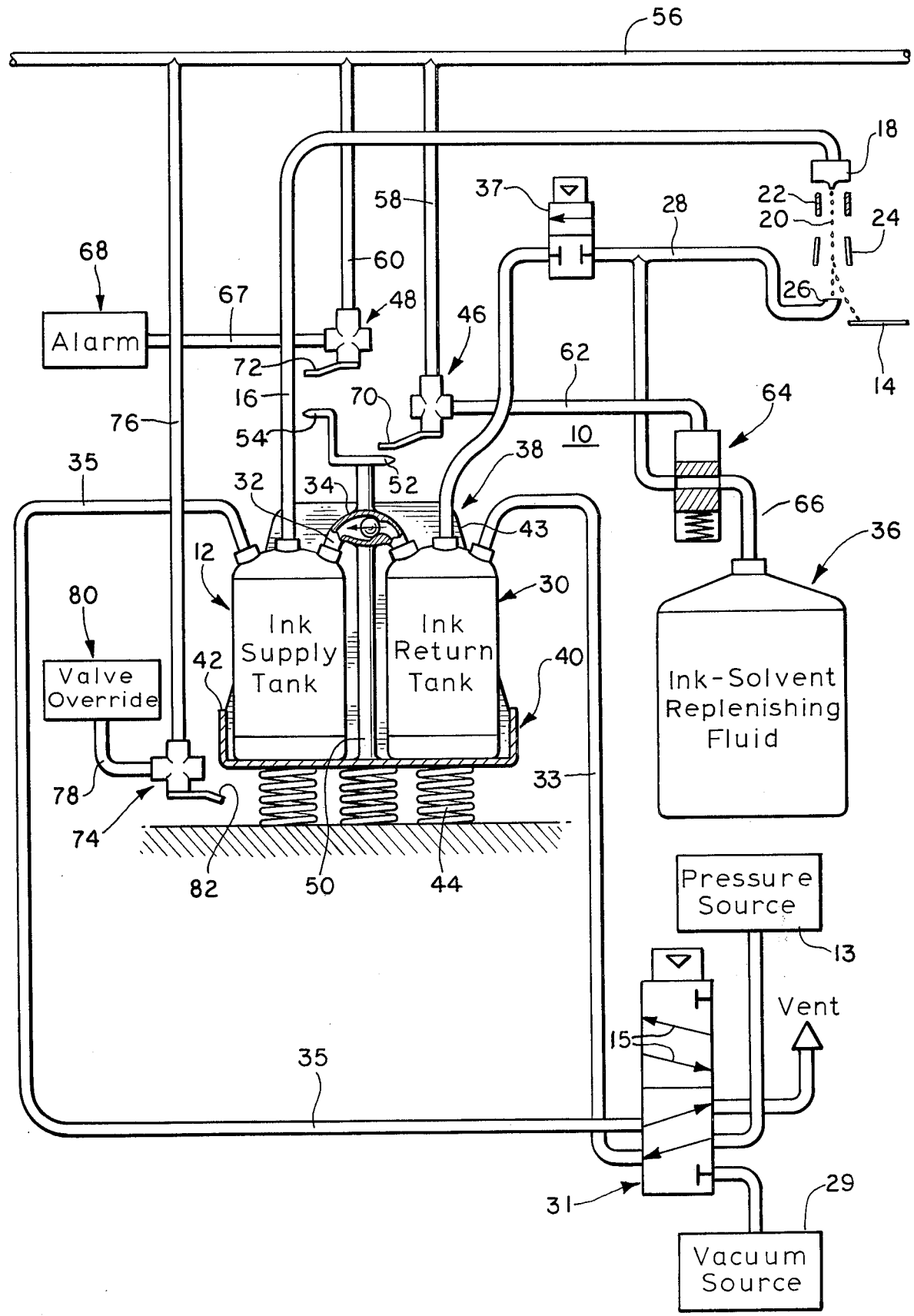

INK MONITORING AND AUTOMATIC FLUID REPLENISHING APPARATUS FOR INK JET PRINTER

BACKGROUND OF THE INVENTION

This invention relates generally to ink jet printing apparatus and more particularly to an automatic ink fluid replenishing system for such apparatus.

In ink jet printing apparatus, ink is supplied from a tank or container to a nozzle from which drops of ink are projected toward a record medium. Some of the drops are used to print predetermined patterns on the record medium while others which are not used are caught before impinging on the record medium for return to the ink supply. To compensate for the ink loss, a replenishing fluid, usually including an ink-solvent mixture, provided in a separate container is added to the supply tank when needed.

In some instances, a single ink tank is employed from which ink is pumped to the nozzle for projection to the record medium and to which unused ink is returned. This arrangement however, requires a mechanical ink pump for pumping ink to the nozzle, a vacuum pump for drawing unused ink drops back to the tank, a level detector in the tank to indicate the quantity of ink supply remaining, as well as ink filters, regulators, valves and the like. The single ink tank system is, as can be seen, rather complex requiring several pumps and other components which detract from the reliability and cost of the system.

An improvement on the latter system is the two tank ink supply system. In this system, an ink supply tank is used which is pressurized to force ink therefrom to a nozzle from which ink drops are projected toward a record medium. A separate return tank which is at a negative pressure is also employed in conjunction with an ink drop catcher to draw unused ink droplets thereto for reuse. The tanks are joined by a conduit normally closed off by a valve. Periodically the valve is opened to transfer ink from the return tank to the supply tank. In addition, replenishing fluid is added manually to the return tank when it is believed that the system requires such fluid. The latter, however, makes it necessary to check almost constantly the ink reserves. If such checks are not made, there is a good possibility that the ink in the system would be depleted and/or change composition during a printing cycle. The problem of checking and adding replenishing fluid to the ink is complicated further because of the unknown and constantly changing division of the ink supply between the supply and return tanks. One possibility is to make use of ink tank sensors to indicate the level of fluid in the tanks. This however has not proven to be satisfactory and the sensors are costly. Moreover, it is not desirable to use sensing circuits with the ink tanks because of safety requirements.

SUMMARY OF THE INVENTION

Accordingly, it is a primary object of the present invention to provide in the two tank ink supply system of an ink jet printing apparatus, new and improved ink monitoring and automatic fluid replenishing apparatus which overcomes the drawbacks of the prior art.

It is a further object of this invention to provide an ink monitoring and automatic fluid replenishing apparatus as described heretofore which is relatively simple in design, low in cost and meets safety requirements associated with an ink supply system for ink jet printing apparatus.

Briefly, a preferred embodiment of the ink monitoring and automatic fluid replenishing apparatus according to the invention comprises a mechanical scale upon which the supply and return tanks of the two tank supply system for an ink jet printing apparatus are mounted. The scale is of a conventional type which assumes a predetermined level when a predetermined volume of ink is provided in one or both of the tanks. A bottle holding a volume of ink replenishing fluid is coupled by a tube to the ink return tank. A normally closed valve is provided between the fluid replenishing bottle and the ink return tank.

So long as the volume of ink in the supply and return tanks remains greater than a predetermined volume, determined by the weight of the ink, the valve remains closed. As ink is removed from the tank through printing, evaporation or the like, the volume and thus the weight of the ink in the tanks is reduced. The reduced weight of the ink thus causes the scale to change position, moving higher. When the scale is moved to a predetermined position, an actuator on the scale engages a switch which in turn operates the valve between the replenishing fluid bottle and return tank. With the valve open, the vacuum in the return tank draws fluid from the bottle into the tank until the weight of the fluid increases the combined weight of the liquid (ink and replenishing fluid) in the return and supply tanks. The increased weight moves the scale downwardly to deactuate the switch, thus closing the valve to stop the drawing of replenishing fluid into the return tank. With this system, the composition and volume of printing ink remains proper during the printing cycle.

Replenishing fluid must be added to the bottle periodically. The level of the replenishing fluid can be monitored also, indirectly by the provision of a second switch located at a position whereat it will be actuated only if the weight of the printing liquid becomes and remains less than that required to actuate the first switch. Actuation of the second switch can be made to discontinue the operation of the printing apparatus or can operate a visual or audible signal which tells an operator to refill the replenishing fluid bottle.

A third switch can also be provided to sense the weight of the supply and return tanks in the case wherein too great a volume of ink is inadvertently placed in the tanks.

DESCRIPTION OF THE DRAWING

In the drawing, the single FIGURE is a diagrammatical representation of an ink jet printing apparatus having a two tank ink supply system and including the ink monitoring and automatic fluid replenishing apparatus according to the invention.

DETAILED DESCRIPTION OF THE DRAWING

Referring now to the FIGURE of the drawing in greater detail, there is shown therein an ink jet printing apparatus designated generally by the numeral 10. The apparatus includes an ink supply tank 12 in which ink for use in printing on a record medium 14, is stored. A conduit or tube 16 connects the supply tank 12 to an ink jet nozzle 18 from which ink drops such as 20 are projected toward the record medium. The supply tank 12 is pressurized by means of pressure source 13 acting through conduit 35 and valve 31, which during the printing cycle is in an actuated condition as indicated by arrows 15 to force ink from tank 12 into the nozzle.

In a conventional manner, a transducer or the like device (not shown) coupled to the nozzle 18 squeezes or vibrates the nozzle at a predetermined frequency. The vibration breaks the ink stream up into drops 20.

Around the region where the drops are formed, there is provided a charging ring 22. The ring coupled to suitable electrical circuitry (not shown) applies a charge to each drop, the magnitude of which varies in accordance with information to be printed. Downstream of the charging ring there is provided a pair of spaced high voltage deflection plates 24 between which the drops pass on their way to the record medium 14. The deflection plates establish an electrical field of constant magnitude therebetween to deflect the charged drops passing therethrough toward the record medium 14 according to the charges placed on the drops by the charging ring 22. The drops impact on the record medium to form a character or code marking. Drops which are not to be used in the printing procedure, are not charged or charged slightly and as such pass through the electric field with minimal deflection. The unused drops are caught in a catcher 26 which is coupled via conduit 28 to an ink return tank 30. The ink return tank is at a negative pressure and as such draws the unused ink drops through conduit 28 thereinto. The negative pressure in return tank 30 is provised by vacuum source 29 acting through actuated valve 31 and conduit 33, coupled to tank 30.

After printing with the apparatus 10 for a period of time, the ink in the supply tank may become depleted. At this time, ink from the return tank 30 must be transferred to the supply tank 12 for further use in the printing process. To transfer the ink, an inter-connecting conduit 32 is provided. A check valve 34 which is closed during normal operation of the system, is inserted into the conduit to isolate the tanks during printing. The valve is operated to an open condition to transfer ink from the return tank to the supply tank. When this occurs, the supply tank is vented through conduit 35 and valve 31, now in a deactuated condition. The return tank is then pressurized through conduit 33 and deactuated valve 31 to force ink through the conduit 32 into the supply tank. During the transfer of ink from return tank 30 to supply tank 12, a valve 37 is operated to close off conduit 28, preventing reverse flow of ink into ink drop catcher 26. The latter procedure is generally carried out after shutdown of the machine when a day of printing has been completed. This avoids the necessity of having to wait for the venting to take place to make the transfer and repressurization and evacuation of the supply and return tanks, respectively, before printing can be resumed.

In the event the ink supply in both the tanks has been reduced to a predetermined level it usually follows that the composition of the ink has changed due to use and evaporation of solvent therefrom. As such, replenishing fluid comprised of a mixture of ink and solvent, must be added to the ink supply. Replenishing fluid is provided in bottle 36 positioned adjacent the ink jet printing apparatus. As explained heretofore, with a two tank ink supply system of the type shown, one cannot easily add replenishing fluid directly to the supply tank 12 because of the increased pressure thereof. Consequently, the replenishing fluid must be added to the ink return tank. The time at which such replenishment should take place, however, to provide a proper ink composition and volume is generally not known without constant checking of the ink volume.

To monitor the ink supply so that the volume and hence the composition thereof is adequate for printing, there is provided ink monitoring and automatic fluid replenishing apparatus according to the invention, designated generally in the drawing by numeral 38.

The ink monitoring apparatus 38 includes a mechanical scale device 40, herein shown as comprising a platform 42 upon which both the ink supply and return tanks 12, 30, respectively, are placed. A back wall 43 connected to the scale platform provides support for the tanks. Constant rate springs 44 support platform 42 and exert a force thereagainst upwardly toward first and second switches 46, 48, the function of which will be described hereinafter.

A bar 50 having a pair of protruding arms 52, 54 extends from the scale platform 42. The arms 52, 54 are provided for actuating switches 46, 48.

The switches 46, 48 as shown herein are air, rather than electrically operated switches. Such switches are employed to avoid sparking and the like in the area of the ink and replenishing fluids which are in most cases flammable.

A main air supply tube is coupled to switches 46, 48 via conduits 58, 60, respectively. Switch 46 is also connected through conduit 62 to an air operated valve 64 coupled to conduit 66 which connects the replenishing fluid bottle 36 to the ink return tank 30 via conduit 28. Switch 48 is connected through conduit 67 to an alarm 68 which provides an audio and/or visual indication that the replenishing fluid bottle is empty. Alternatively, the alarm can be made to discontinue the operation of the printing apparatus.

In operation, a predetermined volume and composition of ink is initially provided in supply tank 12. The weight and thus the volume of ink is in effect "sensed" by the scale 42. The platform 40 is lowered to a predetermined position under the weight of the ink supply.

After the supply tank is pressurized and the return tank evacuated, the printing process begins. As ink is used, the weight of the volume of ink is decreased. The total volume of ink initially added to the supply tank is monitored for depletion in that ink not used in printing is reclaimed and held in the return tank, also positioned on the scale.

When the weight of the total volume of ink in both the supply and return tanks is decreased to a predetermined magnitude, the scale platform under the force of the compression springs 44, is raised to a first level. At this level, actuator arm 52 engages arm 70 of switch 46. The movement of the arm 70 opens switch 46 permitting air from conduit 56 to enter conduit 62. The force of the air opens valve 64 permitting replenishing fluid from bottle 36 to be drawn by the action of the vacuum in the ink return tank, into the last-mentioned tank. The added weight of the replenishing fluid causes the total weight of the liquid in tanks 12 and 30 to be increased once again, thus lowering the scale platform and actuator arm 52. This causes the actuator arm to release switch actuator 70 so that switch 46 assumes its normally closed condition, cutting off valve 64 to prevent additional replenishing fluid from flowing into the ink return tank 30.

It should be noted that the weight of the volume of ink selected to operate the valve 64 which causes the addition of replenishing fluid, is determined on the basis of experience which shows that at this time the ink composition has most likely changed and requires the addition of replenishing fluid to adjust the composition toward its original consistency. As explained heretofore, at the end of the printing day or at a time when the printing apparatus is to be shut down, a transfer of fluid from the return tank 30 to the supply tank 12 is effected. This is accomplished as described heretofore through valve 34.

The above-described fluid replenishing process continues to take place automatically as controlled by the monitoring and automatic fluid replenishing apparatus 38 according to the invention, so long as fresh replenishing fluid is maintained in bottle 36. In the event the operator forgets to add replenishing fluid to the bottle 36 and the supply of ink and added fluid is depleted by printing, the weight of the remaining volume of liquid in tanks 12 and 30 decreases accordingly, raising scale platform 42 until the actuator arm 54 engages actuator 72 of switch 48. At this time, switch 48 is operated to permit air from air source conduit 56 to enter conduit 67 and to trip the alarm 68. The alarm can be a visual alarm such as a lamp which is illuminated or a flashing light, or an audible alarm, such as a buzzer, bell or the like. Moreover, the operation of alarm 68 can be made to effect a complete shutdown of the printing apparatus 10 and/or to inhibit the transfer of ink between the tanks 30, 12, respectively.

In addition to the two switches 46, 48 described, a third switch 74 shown beneath the scale platform 42 may be employed. This switch is likewise air operated, coupled to the air source conduit 56 through conduit 76 and via conduit 78 to a valve override control 80. Switch 74 is normally closed, but will be operated when the weight of the volume of ink in the tanks 12 and 30 is greater than a predetermined weight. The latter can occur if the ink return tank is filled without the liquid therein being transferred to the supply tank, and thereafter through negligence the supply tank is manually filled with fresh ink. To avoid a problem which could be caused when it is attempted to transfer the ink from the return tank to the supply tank, the platform 42 engages switch actuator 82 to actuate switch 74. In accordance with the actuation of switch 74 the valve override control is operated preventing the deactuation of valve 31 upon shutdown of the machine. This is turn maintains the pressure in tank 12, thus avoiding transfer of ink during the printing operation. In addition, an alarm is sounded to inform the operator of the situation.

From the above, it can be seen that the ink monitoring and automatic fluid replenishing apparatus 38 according to the invention provides a simple, yet effective means to aid in monitoring the ink supply in an ink jet printer using a twin tank system. The ink monitoring and fluid replenishing apparatus 38 likewise maintains the composition of the ink at a proper consistency, etc., by adding replenishing fluid when necessary. The latter insures the operation of the printing apparatus without ink clogging or the like.

While a preferred embodiment of the invention has been shown and described, it should be understood that the invention is not limited thereto since many modifications may be made. It is therefore contemplated to cover by the present application any and all such modifications as fall within the true spirit and scope of the appended claims.

What we claim is:

1. An ink supply arrangement for an ink jet printing apparatus including in combination:
    pressurized ink supply tank means connectable to an ink jet nozzle from which ink drops are projected toward a record medium, for supplying ink under pressure to said nozzle;
    ink return tank means connectable to ink catcher means, for storing ink drops not used in the printing process, said ink return tank means being evacuated to provide a force for drawing ink drops from said catcher means to said ink return tank means;
    container means having a supply of ink replenishing fluid therein, said container means being coupled to said return tank means for communication therewith, whereby replenishing fluid is drawn from said container means to said return tank means; and
    ink monitoring and fluid replenishing apparatus for adding automatically replenishing fluid from said container means to said return tank means when necessary to increase the volume of liquid in said supply and return tank means to a predetermined volume, said apparatus including:
    means for sensing the total volume of liquid in both said supply and return tank means,
    normally closed valve means interposed between said fluid replenishing container means and said return tank means,
    switch means coupled to said valve means and being actuable for operating said valve means to an open condition, said switch means being actuated by said volume sensing means upon said volume of liquid in said supply and return tank means decreasing to a predetermined volume, whereby replenishing fluid is drawn from said container means to said return tank means, said switch means being deactuated when said liquid volume is increased predeterminedly.

2. An ink supply arrangement as claimed in claim 1 wherein said means for sensing the total volume of liquid in said supply and return tank means includes weight measuring means for determining the weight of the liquid volume in said supply and return tank means, said weight measuring means being operable to actuate the switch means upon the weight of said volume decreasing predeterminedly.

3. An ink supply arrangement as claimed in claim 2 wherein said weight sensing means comprises a scale having a platform upon which said ink supply and return tank means are mounted, platform support means operable to alter the position of said platform in response to weight changes in the volume of liquid in said supply and return tanks, said platform assuming a predetermined level when a predetermined volume of liquid is present in said supply and return tank means, said platform being moved to a second level when a predetermined volume of liquid is removed from said supply and return tank means, said weight sensing means also including switch actuator means for operating said switch means to an actuated condition upon said platform reaching said second level, thereby to open said valve means permitting replenishing fluid to be drawn into said return tank means.

4. An ink supply arrangement as claimed in claim 1 further including second switch means actuable by said volume sensing means when said volume of liquid in said supply and return tank means decreases predeterminedly below said predetermined volume and alarm means coupled to said second switch means and operable in response to the actuation thereof to indicate the need for adding replenishing fluid to said container means.

5. An ink supply arrangement as claimed in claim 4 further including conduit means interposed between said supply and return tank means for transferring liquid from said return tank means to said supply tank means, normally closed valve means included in said conduit means for blocking the flow of liquid between said supply and return tank means, said valve means being operable to an open condition for transferring liquid between said supply and return tank means, and third switch means actuable by said volume sensing means when said volume of liquid in said supply and return tank means increases predeterminedly above said predetermined volume, said switch means being coupled to said last-mentioned normally closed valve means for maintaining said valve means closed despite attempts to open said valve means for transfer of said liquid.

6. In an ink jet printing apparatus including a nozzle from which ink drops are projected toward a record medium for printing thereon, a pressurized ink supply tank coupled to said nozzle for providing ink under pressure, thereto, an ink catcher for catching ink drops not used in printing, an ink return tank at negative pressure, coupled to said catcher for drawing ink drops therefrom into said return tank and a container for ink-solvent replenishing fluid coupled to said ink return tank for supplying ink-solvent fluid thereto upon a predetermined decrease in the volume of liquid in said supply and return tanks, ink monitoring and fluid replenishing apparatus for automatically adding replenishing fluid from said container to said return tank when the volume of liquid in said supply and return tanks decreases predeterminedly, said apparatus including in combination:

normally closed valve means interposed between said replenishing fluid container and said return tank, first switch means coupled to said valve means for operation thereof to an open condition, and means for sensing the weight of the volume of liquid in said supply and return tanks, said sensing means including switch actuator means for actuating said switch means when the weight of said volume decreases predeterminedly, whereby said normally closed valve means is opened to permit replenishing fluid to be drawn from said container into said ink return tank, said switch means being deactuated when the weight of the volume of liquid in said tanks increases predeterminedly.

7. An ink monitoring and fluid replenishing apparatus as claimed in claim 6 further including second switch means and alarm means coupled to said second switch means, said second switch means being actuated by said weight sensing means when the weight of the volume of liquid in said ink supply and return tanks decreases predeterminedly below the weight of said volume of liquid necessary to actuate said first switch means, said alarm means being operated in response to the actuation of said second switch means for indicating the depletion of ink-solvent replenishing fluid in said container.

8. An ink monitoring and fluid replenishing apparatus as claimed in claim 6 wherein said weight sensing means includes mechanical scale means having a platform on which said supply and return tanks are mounted, means for supporting said platform operable to alter the position thereof in response to weight changes in the volume of liquid in said supply and return tanks and switch actuation means coupled to said platform for actuating said switch means in accordance with the position of said platform.

9. An ink monitoring and fluid replenishing apparatus as claimed in claim 8 wherein said platform support means includes springs connected to said platform providing a force thereagainst for moving said platform upwardly against the weight of said supply and return tanks and volume of liquid therein, said switch means being mounted at a predetermined position in the path of said actuator means coupled to said platform whereby said last-mentioned means engages said switch means for actuation thereof when the weight of said volume of liquid decreases predeterminedly.

* * * * *